United States Patent
Schleiferböck et al.

(10) Patent No.: US 12,181,316 B2
(45) Date of Patent: Dec. 31, 2024

(54) VIBRONIC SENSOR

(71) Applicant: Endress+Hauser SE+Co. KG, Maulburg (DE)

(72) Inventors: Jan Schleiferböck, Rümmingen (DE); Tobias Brengartner, Emmendingen (DE); Sergey Lopatin, Lörrach (DE); Julia Rosenheim, Wehr (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 282 days.

(21) Appl. No.: 17/904,411

(22) PCT Filed: Jan. 28, 2021

(86) PCT No.: PCT/EP2021/051993
§ 371 (c)(1),
(2) Date: Aug. 17, 2022

(87) PCT Pub. No.: WO2021/165011
PCT Pub. Date: Aug. 26, 2021

(65) Prior Publication Data
US 2023/0055786 A1    Feb. 23, 2023

(30) Foreign Application Priority Data
Feb. 17, 2020   (DE) .......................... 102020104066.0

(51) Int. Cl.
*G01F 1/66*    (2022.01)
*G01F 1/32*    (2022.01)
(Continued)

(52) U.S. Cl.
CPC ............ *G01F 1/662* (2013.01); *G01F 1/3227* (2013.01); *G01F 23/296* (2013.01); *G01N 9/002* (2013.01); *G01N 11/16* (2013.01)

(58) Field of Classification Search
CPC ...... G01F 1/662; G01F 1/3227; G01F 23/296; G01F 1/32; G01F 1/66; G01N 9/002; G01N 11/16; G01N 2009/006
See application file for complete search history.

(56) References Cited

U.S. PATENT DOCUMENTS

| | | | | |
|---|---|---|---|---|
| 5,987,997 A | * | 11/1999 | Roskam | .................. G01F 1/667 |
| | | | | 73/861.29 |
| 2006/0142954 A1 | * | 6/2006 | Muller | ................ G01F 23/2967 |
| | | | | 702/30 |

FOREIGN PATENT DOCUMENTS

| | | |
|---|---|---|
| DE | 10050299 A1 | 4/2002 |
| DE | 10057974 A1 | 4/2004 |

(Continued)

*Primary Examiner* — Eric S. McCall
*Assistant Examiner* — Anthony W Megna Fuentes
(74) *Attorney, Agent, or Firm* — Christopher R. Powers; Endress+Hauser (USA) Holding, Inc.

(57) ABSTRACT

A device for determining and/or monitoring at least one process variable of a medium in a container includes four, rod-shaped elements arranged on a membrane, three piezoelectric elements and an electronics system, wherein one first and one second rod-shaped element are arranged and configured such that they form a mechanically vibratable unit, wherein the device is configured to excite the vibratable unit via an excitation signal to create mechanical oscillations, to receive the mechanical oscillations of the vibratable unit, to convert them into a first received signal, to transmit a transmitted signal, and to receive a second received signal, and wherein the electronics system is configured to determine the at least one process variable based on the first and/or second received signal.

15 Claims, 3 Drawing Sheets

(51) Int. Cl.
  *G01F 23/296*  (2022.01)
  *G01N 9/00*   (2006.01)
  *G01N 11/16*  (2006.01)

(56) References Cited

FOREIGN PATENT DOCUMENTS

| | | |
|---|---|---|
| DE | 102005015547 A1 | 10/2006 |
| DE | 102006033819 A1 | 1/2008 |
| DE | 102006034105 A1 | 1/2008 |
| DE | 102007013557 A1 | 2/2008 |
| DE | 102007043811 A1 | 3/2009 |
| DE | 102009026685 A1 | 12/2010 |
| DE | 102009028022 A1 | 2/2011 |
| DE | 102010030982 A1 | 1/2012 |
| DE | 102012100728 A1 | 8/2013 |
| DE | 102015102834 A1 | 9/2016 |
| DE | 102015104536 A1 | 9/2016 |
| DE | 102015122124 A1 | 6/2017 |
| DE | 102016112743 A1 | 1/2018 |
| DE | 102017130527 A1 | 6/2019 |
| EP | 0903563 A1 | 3/1999 |
| EP | 0984248 A1 | 3/2000 |
| WO | 0009973 A1 | 2/2000 |
| WO | 2004017025 A1 | 2/2004 |
| WO | 2020094266 A1 | 5/2020 |

* cited by examiner

VIBRONIC SENSOR

CROSS-REFERENCE TO RELATED APPLICATIONS

The present application is related to and claims the priority benefit of German Patent Application No. 102020104066.0, filed on Feb. 17, 2020, and International Patent Application No. PCT/EP2021/051993, filed Jan. 28, 2021, the entire contents of which are incorporated herein by reference.

TECHNICAL FIELD

The invention relates to a device for determining and/or monitoring at least one process variable of a medium in a container. The process variable is, for example, a fill-level, in particular a limit level, the density, and/or the viscosity of the medium. The container can, for example, be a tank or a pipeline.

BACKGROUND

Vibronic sensors are often used in process and/or automation engineering. In the case of fill-level measuring devices, they have at least one mechanically vibratable unit such as, for example, an oscillating fork, a single rod, or a membrane. During operation, the vibratable unit is excited to mechanical oscillations by a driving/receiving unit, often in the form of an electromechanical transducer unit, that can, in turn, be a piezoelectric drive or an electromagnetic drive, for example.

In the case of flow meters, the mechanically vibratable unit can, however, also be designed as a vibratable pipe, through which the respective medium flows, such as in a meter operating according to the Coriolis principle.

A wide variety of corresponding field devices are made by the applicant and, in the case of fill-level measuring devices, are distributed under the name LIQUIPHANT or SOLIPHANT. The underlying measurement principles are known in principle from numerous publications. The driving/receiving unit excites the mechanically vibratable unit to mechanical vibrations by means of an electrical excitation signal. Conversely, the driving/receiving unit can receive the mechanical vibrations of the mechanically vibratable unit and transduce these into an electrical received signal. The driving/receiving unit is accordingly either a separate driving unit and a separate receiving unit, or a combination driving/receiving unit.

In many instances, the driving/receiving unit is thereby part of a feedback electrical resonant circuit, by means of which the excitation of the mechanically vibratable unit to mechanical vibrations takes place. For example, the resonant circuit condition, according to which the amplification factor is ≥1, and all phases occurring in the resonant circuit result in a multiple of 360°, must be fulfilled for a resonant vibration.

To excite and fulfill the resonant circuit condition, a defined phase shift between the excitation signal and the received signal must be ensured. A specifiable value for the phase shift, i.e., a target value for the phase shift between the excitation signal and the received signal, is therefore frequently set. For this purpose, a wide variety of solutions, both analog and digital methods, have become known from the prior art. In principle, the phase shift can be set, for example, by using a suitable filter, or else can be regulated by means of a control loop to a predeterminable phase shift, the setpoint value. For example, DE102006034105A1 discloses the use of an adjustable phase shifter. By contrast, the additional integration of an amplifier with an adjustable amplification factor for the additional control of the vibration amplitude was described in DE102007013557A1. DE102005015547A1 proposes the use of an all-pass filter. Setting the phase shift is also possible by means of a so-called frequency search, as disclosed for example in DE102009026685A1, DE102009028022A1, and DE102010030982A1. However, the phase shift can also be regulated to a predeterminable value by means of a phase-locked loop (PLL). An excitation method based thereon forms the subject matter of DE00102010030982A1.

Both the excitation signal and the received signal are characterized by their frequency $\omega$, amplitude A, and/or phase $\Phi$. Accordingly, changes in these variables are usually used to determine the process variable in question, such as a predetermined fill-level of a medium in a tank, or else the density and/or viscosity of a medium, or the flow of a medium through a pipe. In the case of a vibronic level switch for liquids, for example, a distinction is made between whether the vibrating unit is covered by the liquid or vibrates freely. The two states—the free state and the covered state—are thus differentiated—for example, based upon different resonant frequencies, i.e., a frequency shift. The density and/or viscosity, in turn, can be determined with such a measuring device only if the vibratable unit is covered by the medium.

The density and/or viscosity, in turn, can be determined with such a measuring device only if the vibratable unit is covered by the medium. In connection with the determination of the density and/or viscosity, different possibilities have likewise become known from the prior art, such as those disclosed in documents DE10050299A1, DE102007043811A1, DE10057974A1, DE102006033819A1, DE102015102834A1, or DE102016112743A1.

With a vibronic sensor, several process variables can accordingly be determined and used for characterizing the respective process. In many cases, however, further information about the process, especially, knowledge of further physical and/or chemical process variables and/or process parameters, is required for comprehensive process monitoring and/or control. This can be achieved, for example, by integrating further field devices into the respective process. The measured values provided by the various measuring devices can then be further processed in a suitable manner in a unit superordinate to the devices.

Thus, a vibronic multisensor has become known from the previously unpublished international patent application with the file number, PCT/EP2019/064724, which combines two measuring principles—the vibronic measuring principle and the ultrasonic measuring principle—in a single device. The sensor unit carries out mechanical vibrations on the one hand; in addition, a transmitted signal is emitted. In response to the mechanical vibrations and to the transmitted signal, two received signals are received and evaluated with regard to at least two different process variables. The two received signals can, advantageously, be evaluated independently of one another.

Proceeding from the prior art, the present invention is based upon the aim of expanding the field of application of a vibronic sensor.

SUMMARY

This aim is achieved by a device for determining and/or monitoring at least one process variable of a medium in a container and by a method for determining and/or monitoring at least one process variable of a medium in a container according to the present disclosure.

The device according to the invention comprises four, rod-shaped elements arranged on a membrane, three piezoelectric elements, and an electronics system, wherein one first and one second rod-shaped element are arranged and configured in such a way that they form a mechanically vibratable unit, wherein the device is configured to excite the vibratable unit by means of an excitation signal to create mechanical oscillations, and to receive the mechanical oscillations of the vibratable unit and to convert them into a first received signal, to transmit a transmitted signal, and to receive a second received signal, and wherein the electronics system is configured to determine the at least one process variable based upon the first and/or second received signal.

The sensor unit is part of a device for determining and/or monitoring one or more process variables of a medium, and comprises four, rod-shaped elements, two of which form a vibratable unit, similar or corresponding to an oscillating fork. Two of the three piezoelectric elements are preferably used as a driving/receiving unit for generating and detecting the mechanical oscillations of the mechanically vibratable unit in the form of the first received signal, which is influenced by the medium and accordingly can be used for determining a process variable. The third piezoelectric element is used to transmit the transmitted signal and to receive the second received signal. The transmitted signal passes through the medium at least temporarily and in sections, and is likewise influenced by the physical and/or chemical properties of the medium, and can accordingly also be used for determining a process variable of the medium.

Within the scope of the present invention, it is, advantageously, possible to implement at least two measuring principles in a single device, similar to the previously unpublished international patent application with the file number PCT/EP2019/064724, to which reference is made in its entirety within the scope of the present application. The sensor unit carries out mechanical vibrations on the one hand; in addition, a transmitted signal is emitted. In response to the mechanical oscillations and to the transmitted signal, two received signals are received and evaluated with regard to at least one, or preferably with regard to two, different process variable(s). The two received signals can, advantageously, be evaluated independently of one another. In this way, according to the invention, the number of determinable process variables can be significantly increased, which results in a higher functionality of the respective sensor or in an extended range of application.

In one embodiment, the device according to the invention comprises four piezoelectric elements. The device is, then, configured, for example, to excite the vibratable unit by means of the electrical excitation signal to create mechanical oscillations by means of a first and second piezoelectric element, and to receive the mechanical oscillations of the vibratable unit and convert it into the electrical received signal, and to transmit the transmitted signal and to receive the second received signal by means of a third and fourth piezoelectric element. In principle, each rod-shaped element can be acted upon by means of the excitation signal and/or the transmitted signal. When two different frequencies of the excitation signal and the transmitted signal are used, a suitable signal separation with respect to the received signals can be carried out in the electronics system.

However, numerous further arrangements and embodiments are also conceivable, which also fall under the present invention. It is conceivable, for example, for a piezoelectric element to be used in each case for generating oscillations and for detecting oscillations of in each case one, rod-shaped element. In other embodiments, however, the two, rod-shaped elements that form the vibratable unit can also be excited to oscillate together. Furthermore, in one embodiment, for example, it is also sufficient for generating and detecting oscillations to use a single piezoelectric element which, for example, may not necessarily be arranged in one of the rod-shaped elements that form the vibratable unit. In the case where three piezoelectric elements are provided, and the third piezoelectric element is used to generate the transmitted signal, one of the rod-shaped elements which is not used as a vibratable unit can be configured and/or arranged in such a way that the transmitted signal is reflected at this rod-shaped element and guided back to the third piezoelectric element. However, it is also possible for one piezoelectric element to be used to generate the transmitted signal and another to detect the second received signal.

The arrangement and configuration of the piezoelectric elements and rod-shaped elements can in particular correspond to one of the embodiments for a vibronic sensor described in DE102017130527A1, at least with regard to the elements that form the vibratable unit. Reference is made to this application in its entirety within the scope of the present invention.

Finally, it is both conceivable that the sensor unit simultaneously be acted upon by means of the excitation signal and the transmitted signal, wherein the excitation signal and the transmitted signal are superimposed upon one another or are generated at the same time, and different piezoelectric elements of the device be acted upon by different signals. Alternatively, however, the sensor unit can also be acted upon alternately by the excitation signal and the transmitted signal. For example, the excitation signal is an electrical signal having at least one predeterminable frequency, in particular a sinusoidal or a rectangular signal. The mechanically vibratable unit is preferably excited at least temporarily to vibrate resonantly. The transmitted signal in turn is in particular an ultrasonic signal, in particular a pulsed ultrasonic signal, and in particular at least one ultrasonic pulse.

With the device according to the invention, it is possible to determine at least partially different process variables and/or process parameters independently of one another, so that a comprehensive analysis of the respective process is made possible by means of a single meter. In addition, by using the same sensor unit for both measurement methods, the accuracy of the measurements can be significantly increased. In addition, the two process variables can be used to monitor the state of the device.

In one embodiment, at least one piezoelectric element is arranged at least partially within a rod-shaped element. In particular, several or all of the piezoelectric elements can also be arranged in one of the rod-shaped elements. Corresponding embodiments of a sensor unit have been described, for example, in documents DE102012100728A1 and DE102017130527A1. It should be pointed out that the present invention is, however, not limited to one of the possible embodiments of the sensor unit described in the two documents. Rather, these are only exemplary, possible design embodiments. It is not absolutely necessary to arrange the piezoelectric elements exclusively in the region of the rod-shaped elements. Rather, some of the piezoelectric elements used can also be arranged in the region of the membrane on which the rod-shaped elements are formed.

In a further embodiment, the process variable is a fill-level, in particular a predeterminable fill-level, the density, the viscosity, the acoustic velocity, the Reynolds number, or a variable derived from at least one of these variables.

It is further advantageous if the electronics system is configured to determine at least two different process variables on the basis of the first and/or second received signal. In this context, numerous variants are conceivable, some preferred variants of which are specified in the previously unpublished international patent application with the file number PCT/EP2019/064724.

Some particularly preferred variants for possible embodiments of the sensor unit, i.e., the arrangement and/or embodiments of the rod-shaped and piezoelectric elements, are specified below. However, the invention is by no means limited to the described variants.

In one embodiment, the first and second rod-shaped elements and the third and fourth rod-shaped elements are in each case configured identically and are arranged opposite one another in relation to a center point of a surface of the membrane on which the rod-shaped elements are formed. The rod-shaped elements are thus configured identically in pairs and are arranged symmetrically in relation to the center point of a surface, facing the medium, of the membrane.

In a further embodiment, an angle between a first connecting line between the first and second rod-shaped elements and a second connecting line between the third and fourth rod-shaped elements is substantially perpendicular to one another. The two connecting lines therefore have an angle of 90° to one another.

For the rod-shaped elements, a distance from the center point of the membrane can in each case be identical or at least partially different. In particular, for each pair of rod-shaped elements, in particular the first and second rod-shaped elements and the third and fourth rod-shaped elements, the distances from the center point of the surface, facing the medium, of the membrane can each be the same.

In yet another embodiment, the first and second rod-shaped elements and the third and fourth rod-shaped elements are in each case of the same length, wherein a length of the first and second rod-shaped elements is greater than a length of the third and fourth rod-shaped elements. The rod-shaped elements are thus of the same length in pairs. In particular, the first and second rod-shaped elements are used for generating oscillations.

Finally, in one embodiment, the first and second rod-shaped elements and the third and fourth rod-shaped elements each have an identical base area, wherein a base area of the first and second rod-shaped elements is larger than a base area of the third and fourth rod-shaped elements.

The aim upon which the invention is based is further achieved by a method for determining and/or monitoring at least one process variable of a medium in a container, wherein a mechanically vibratable unit is excited by means of an excitation signal to create mechanical oscillations, and the mechanical oscillations of the vibratable unit are received and converted into a first received signal, a transmitted signal is transmitted, and a second received signal is received, and wherein the at least one process variable is determined on the basis of the first and/or second received signal.

In one embodiment of the method, a flow characteristic of the medium is determined. The method according to the invention is thus advantageously used to characterize a flowing medium. It is advantageous if a flow rate of the medium is determined by means of the ultrasonic measuring principle, i.e., on the basis of the transmitted signal and the second received signal, e.g., on the basis of different transit times for a start time and reception time of the transmitted signal or second received signal. A fill-level and a flow can thus be determined with a sensor.

In this regard, it is advantageous for the third and/or fourth rod-shaped element to be used as a baffle which generates vortices in the medium in the case of a flowing medium, wherein the vortices have a speed-dependent, vortex shedding frequency from the baffle, wherein a vortex shedding frequency is determined on the basis of pressure fluctuations, caused by the vortices, by means of the vibratable unit, and wherein the Strouhal number, the Reynolds number, and/or a variable derived from the Strouhal number and/or the Reynolds number is determined on the basis of the vortex shedding frequency. In this context, reference is made to document WO00/09973A1, in which a similar procedure for the case of a piezoelectric vortex sensor is described. It is further advantageous for this embodiment if the third and/or fourth rod-shaped element(s) is/are designed in such a way that the formation of vortices is promoted.

At least one of the rod-shaped elements is used as a baffle, and thus for vortex generation. This is a Kármán vortex street, in which the frequency of the vortex generation is determined by the Reynolds number. The Reynolds number describes the ratio of inertia to viscosity and can be determined from the flow rate, the diameter of the baffle used, and the viscosity of the medium. The shedding frequency of the vortices can in turn be determined on the basis of the Strouhal number. The following applies:

$$f = SR\frac{v}{d},$$

where f is the shedding frequency of the vortices, v is the inflow velocity, and d is a characteristic dimension of the baffle. The shedding frequency of the vortices can accordingly be determined on the basis of the Strouhal number, which is dependent upon the shape of the baffle and upon the Reynolds number. For example, the vortex shedding frequency can thus be determined by means of the mechanically vibratable unit, and the flow rate, i.e., the inflow velocity, can be determined on the basis of an ultrasound-based measurement. If the geometry of the inflow body is known, the Reynolds number can then be determined.

In one embodiment of the method, the viscosity and/or density is determined on the basis of the first received signal, and the Reynolds number is taken into account in determining the viscosity and/or density. By taking into account the Reynolds number, the measurement accuracy of the respective sensor when determining the density and/or viscosity can be significantly increased.

In a further embodiment, the flow characteristic is determined using the Strouhal number and/or the Reynolds number. This is in particular a flow property of the medium.

Finally, in one embodiment of the method according to the invention, the excitation signal and the transmitted signal are generated in a first operating mode, wherein the at least one process variable is determined in the first operating mode on the basis of the first and/or second received signal, and the flow characteristic of the medium is determined in a second operating mode.

It should also be pointed out that the embodiments described in connection with the method according to the invention can also be applied mutatis mutandis to the device according to the invention, and vice versa.

BRIEF DESCRIPTION OF THE DRAWINGS

The invention and its advantageous embodiments are described in more detail below with reference to the figures, FIG. 1-FIG. 3. The following are shown.

DETAILED DESCRIPTION

Figure 1A:
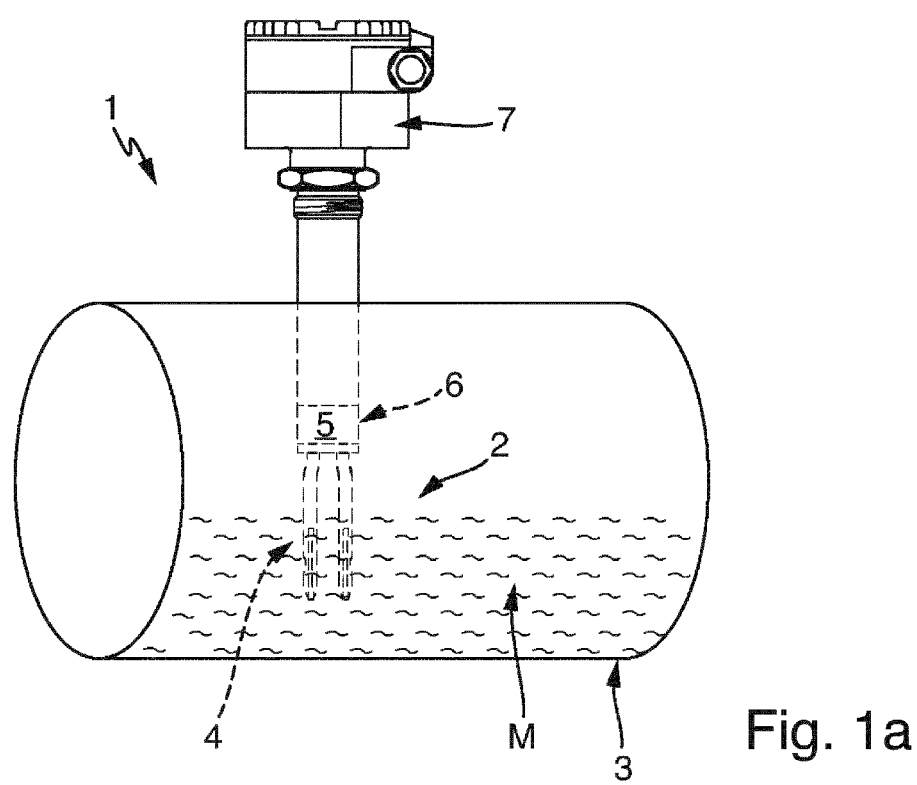
FIG. 1a shows a schematic drawing of a vibronic sensor according to the prior art.

FIG. 1a shows a vibronic sensor 1. The sensor has a sensor unit 2 having a mechanically vibratable unit 4 in the form of an oscillating fork, which is partially immersed in a medium M, which is located in a tank 3. The vibratable unit 4 is excited by the excitation/receiving unit 5 to vibrate mechanically and can be, for example, by means of a piezoelectric stack drive or bimorphic drive. Other vibronic sensors have, for example, electromagnetic driving/receiving units 5. It is possible to use a single driving/receiving unit 5, which serves to excite the mechanical vibrations and to detect them. However, it is also conceivable to implement one driving unit and one receiving unit each. FIG. 1 further shows an electronics system 6, by means of which the signal acquisition, evaluation, and/or feeding takes place.

Figure 1B:
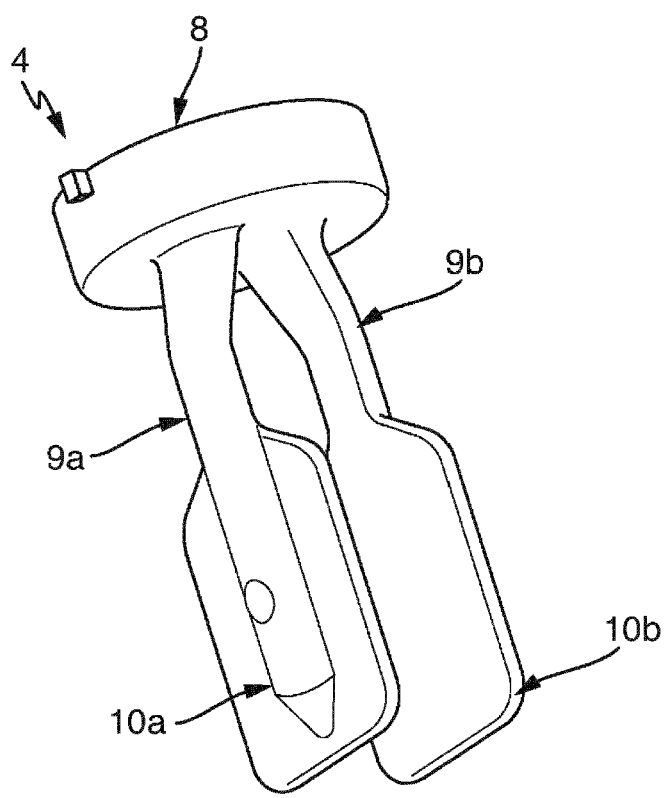
FIG. 1b shows an perspective view of an oscillating fork according to the prior art.

FIG. 1b shows a vibratable unit 4 in the form of an oscillating fork, as is integrated in the vibronic sensor 1 marketed by the applicant under the name LIQUIPHANT, for example. The oscillating fork 4 comprises two, rod-shaped elements 9a, 9b which are mounted on a membrane 8 and on the end of each of which a paddle 10a, 10b is integrally formed. These are therefore also referred to as fork prongs. The driving/receiving unit 5 is fastened to the side of the membrane 8, facing away from the rod-shaped elements 9a, 9b, by means of an integrally-bonded and/or force-fitting connection. For the exemplary embodiment shown, it is assumed that the driving/receiving unit 5 comprises at least one piezoelectric element. During continuous operation, a force is applied to the membrane 8 via the application of an excitation signal $U_A$, e.g., in the form of an electrical alternating voltage which is generated in the electronics system 6. A change in the applied electrical voltage causes a change in the geometric shape of the driving/receiving unit 5, i.e., a contraction or a relaxation within the piezoelectric element such that the application of an electrical alternating voltage as an excitation signal $U_A$ causes an oscillation of the membrane 8 integrally bonded to the driving/receiving unit 5, and therefore of the mechanically vibratable unit 4.

Figure 2:
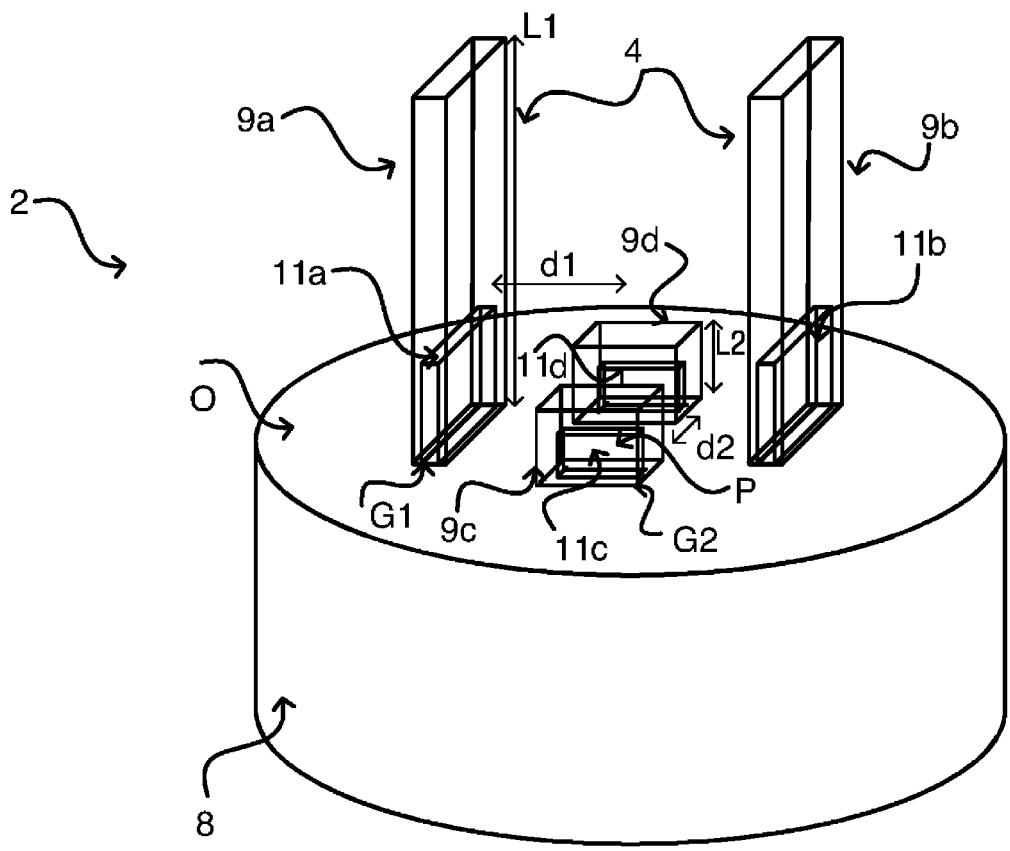
FIG. 2 shows an exemplary embodiment of a device according to the present disclosure.

In a device 1 according to the invention, as shown by way of example in FIG. 2, the sensor unit 2 comprises four, rod-shaped elements 9a-9d, formed on the membrane 8, and four piezoelectric elements 11a-11d.

On the one hand, such a device can be acted upon by an excitation signal A such that the vibratable unit 4 is excited to create mechanical oscillations. The oscillations are generated by means of the two piezoelectric elements 11a and 11b. It is conceivable for both piezoelectric elements to be acted upon by the same excitation signal A as well as for the first vibrating element 11a to be acted upon by means of a first excitation signal $A_1$ and the second vibrating element 11b to be acted upon by means of a second excitation signal $A_2$. It is also conceivable for a first received signal $E_A$ to be received on the basis of the mechanical oscillations, or for a first received signal $E_{A1}$ or $E_{A2}$ to be separately received from each vibrating element 9a, 9b.

In addition, a transmitted signal S is emitted from the third piezoelectric element 11c and is received in the form of a second received signal $E_S$ by the fourth piezoelectric element 11d. Since the two piezoelectric elements 11c and 11d are arranged in the region of the rod-shaped elements 9c and 9d, the transmitted signal S passes through the medium M, provided that the sensor unit 2 is in contact with the medium M, and is influenced accordingly by the properties of the medium M. The transmitted signal S is preferably an ultrasonic signal, in particular a pulsed ultrasonic signal, and in particular at least one ultrasonic pulse. In other embodiments, the fourth piezoelectric element 11d can be omitted. The transmitted signal S is then reflected at the fourth rod-shaped element 11d and received by the third piezoelectric element 11c. In this case, the transmitted signal S passes through the medium M twice, which leads to a doubling of a transit time T of the transmitted signal S.

The first rod-shaped element 9a and the second rod-shaped element 9b are designed identically for the embodiment shown. They have the same base area G1 and length L1, and are arranged symmetrically to one another on opposite sides of a center point P of the surface O, facing the medium M, of the membrane 8. The third rod-shaped element 9c and fourth rod-shaped element 9d are also designed identically, have the same base area G2 and length L2, and are arranged symmetrically to one another on opposite sides of a center point P of the surface O, facing the medium M, of the membrane 8. The length L1 and base area G1 of the first rod-shaped element 9a and second rod-shaped element 9b are each greater than the length L2 and base area G2 of the third rod-shaped element 9c and fourth rod-shaped element 9d.

In addition to this shown embodiment of a device 1 according to the invention, numerous other variants are also conceivable, which likewise fall within the present invention.

Figure 3:
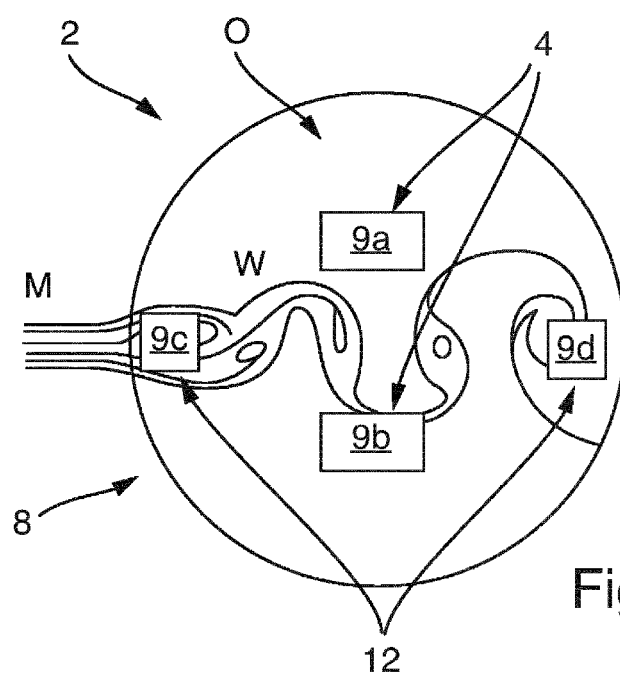
FIG. 3 shows an illustration for determining the Reynolds number by means of the device shown in FIG. 2.

Finally, FIG. 3 illustrates the determination of the Reynolds number RE. A view from above of the sensor unit 2 from FIG. 2 is shown. The first rod-shaped element 9a and the second rod-shaped element 9b form the vibratable unit 4. The third rod-shaped element 9c and fourth rod-shaped element 9d form a flow unit 12 for generating vortex flows W, which are detected by the vibratable unit 4. The third rod-shaped element 12c is used as a baffle.

The invention claimed is:

1. A device for determining and/or monitoring at least one process variable of a medium in a container, the device comprising:
    four, rod-shaped elements disposed on a membrane, including a first element and a second element, wherein the first element and the second element are arranged and configured as to define a mechanically vibratable unit;
    three piezoelectric elements; and
    an electronics system,
    wherein the device is configured to:
        excite the vibratable unit via an excitation signal to generate mechanical oscillations;
        receive the mechanical oscillations of the vibratable unit and convert the mechanical oscillations into a first received signal;
        transmit a transmitted signal; and
        receive a second received signal, and
    wherein the electronics system is configured to determine the at least one process variable based on the first received signal and/or the second received signal.

2. The device of claim 1, comprising four piezoelectric elements.

3. The device of claim 1, wherein at least one piezoelectric element of the three piezoelectric elements is arranged at least partially within the first element or the second element.

4. The device of claim 1, wherein the at least one process variable is a fill-level, a density, a viscosity, an acoustic velocity, a Reynolds number, or a variable derived from at least one of the preceding process variables.

5. The device of claim 1, wherein the electronics system is configured to determine at least two different process variables based upon the first received signal and/or the second received signal.

6. The device of claim 1, wherein the four, rod-shaped elements including a third element and a fourth element,
wherein the first element and the second element are configured identically and are arranged opposite each other relative to a center point of a surface of the membrane on which the first and second elements are disposed, and
wherein the third and the fourth rod-shaped elements are configured identically and are arranged opposite each other relative to the center point of the surface of the membrane on which the third and fourth elements are disposed.

7. The device of claim 6, wherein an angle between a first connecting line between the first and second elements and a second connecting line between the third and fourth elements are substantially perpendicular to each other.

8. The device of claim 6, wherein the first and second elements each have a same length, and the third and fourth elements each have a different same length,
wherein the length of the first and second elements is greater than the length of the third and fourth elements.

9. The device of claim 6, wherein the first and second elements each have a same base area, and the third and fourth elements each have a different same base area,
wherein the base area of the first and second elements is greater than the base area of the third and fourth elements.

10. The device of claim 6, wherein the third element and/or fourth element are configured and arranged as a baffle such that the baffle generates vortices in the medium when the medium is flowing across the device, wherein the vortices have a speed-dependent, vortex shedding frequency from the baffle,
wherein the vortex shedding frequency is determined based on pressure fluctuations, caused by the vortices, using the vibratable unit, and
wherein a Strouhal number of the medium, a Reynolds number of the medium, and/or a variable derived from the Strouhal number and/or the Reynolds number is determined based on the vortex shedding frequency.

11. A method for determining and/or monitoring at least one process variable of a medium in a container, the method comprising:
exciting a mechanically vibratable unit of a sensor unit with an excitation signal to generate mechanical oscillations, wherein the vibratable unit includes a first rod-shaped element and a second rod-shaped element;
receiving the mechanical oscillations of the vibratable unit;
converting the mechanical oscillations into a first received signal;
transmitting a transmitted signal; and
receiving a second received signal,
wherein the at least one process variable is determined based upon the first received signal and/or second received signal,
wherein the sensor unit further includes a third rod-shaped element and/or a fourth rod-shaped element, wherein the third element and/or fourth element are configured as a baffle, which is configured and arranged to generate vortices in the medium when the medium is flowing across the sensor unit, wherein the vortices have a speed-dependent, vortex shedding frequency from the baffle,
wherein a vortex shedding frequency is determined based on pressure fluctuations, caused by the vortices, via the vibratable unit, and
wherein a Strouhal number of the medium, a Reynolds number of the medium, and/or a variable derived from the Strouhal number and/or the Reynolds number is determined based on the vortex shedding frequency.

12. The method of claim 11, wherein the at least one process variable determined is a flow characteristic of the medium.

13. The method of claim 11, wherein the at least one process variable determined is a flow characteristic of the medium, and wherein the flow characteristic is determined using the Strouhal number and/or the Reynolds number.

14. The method of claim 13, wherein the excitation signal and the transmitted signal are generated in a first operating mode, wherein the at least one process variable is determined in the first operating mode based on the first received signal and/or second received signal, and
wherein the flow characteristic of the medium is determined in a second operating mode.

15. The method of claim 11, wherein a viscosity and/or a density of the medium is determined based on the first received signal, and wherein a Reynolds number of the medium is taken into account for determining the viscosity and/or density.

* * * * *